(12) United States Patent
Calvert et al.

(10) Patent No.: US 8,818,780 B2
(45) Date of Patent: Aug. 26, 2014

(54) FORMING A MODEL OF A SUBSURFACE REGION

(75) Inventors: Craig S. Calvert, Houston, TX (US); Gregory S. Benson, Kingwood, TX (US); Xiao-Hui Wu, Sugar Land, TX (US); Dachang Li, Katy, TX (US); Deborah F. Kosich, Houston, TX (US); Lawrence P. Walker, Kingwood, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 578 days.

(21) Appl. No.: 13/125,934

(22) PCT Filed: Oct. 1, 2009

(86) PCT No.: PCT/US2009/059234
§ 371 (c)(1),
(2), (4) Date: Apr. 25, 2011

(87) PCT Pub. No.: WO2010/056427
PCT Pub. Date: May 20, 2010

(65) Prior Publication Data
US 2012/0006560 A1 Jan. 12, 2012

Related U.S. Application Data

(60) Provisional application No. 61/114,798, filed on Nov. 14, 2008, provisional application No. 61/140,161, filed on Dec. 23, 2008.

(51) Int. Cl.
*G06G 7/48* (2006.01)

(52) U.S. Cl.
USPC .......................................................... 703/10

(58) Field of Classification Search
USPC .......................................................... 703/2, 10
See application file for complete search history.

(56) References Cited

U.S. PATENT DOCUMENTS

| 5,838,634 A | 11/1998 | Jones et al. |
| 5,844,799 A | 12/1998 | Joseph et al. |
| 5,905,657 A | 5/1999 | Celniker |

(Continued)

FOREIGN PATENT DOCUMENTS

| EP | 745870 | 5/1996 |
| EP | WO 2004/008388 | 1/2004 |

(Continued)

OTHER PUBLICATIONS

Dubrule, O., et al., 1997, Reservoir Geology Using 3-D Modeling Tools, SPE 38659.

(Continued)

*Primary Examiner* — Kamini S Shah
*Assistant Examiner* — Juan Ochoa
(74) *Attorney, Agent, or Firm* — ExxonMobil Upstream Research Company Law Dept.

(57) ABSTRACT

A method of forming a geologic model of a subsurface region is disclosed. Data related to the subsurface region is obtained. A framework is constructed to represent the subsurface region. A template is selected from a plurality of templates. The selected template provides at least one property that is characteristic of the subsurface region. The selected template is inserted into the framework, to form the geologic model. The geologic model is then outputted.

28 Claims, 6 Drawing Sheets

(56) References Cited

U.S. PATENT DOCUMENTS

| | | | |
|---|---|---|---|
| 5,953,680 A | 9/1999 | Divies et al. | |
| 5,995,906 A | 11/1999 | Doyen et al. | |
| 6,018,498 A | 1/2000 | Neff et al. | |
| 6,035,255 A * | 3/2000 | Murphy et al. | 702/11 |
| 6,044,328 A * | 3/2000 | Murphy et al. | 702/11 |
| 6,070,125 A * | 5/2000 | Murphy et al. | 702/11 |
| 6,106,561 A | 8/2000 | Farmer | |
| 6,128,577 A | 10/2000 | Assa | |
| 6,138,076 A | 10/2000 | Graf et al. | |
| 6,191,787 B1 | 2/2001 | Lu et al. | |
| 6,246,963 B1 | 6/2001 | Cross et al. | |
| 6,370,491 B1 * | 4/2002 | Malthe-Sorenssen et al. | 703/2 |
| 6,374,185 B1 | 4/2002 | Taner et al. | |
| 6,439,854 B1 | 8/2002 | Skaarup | |
| 6,480,790 B1 | 11/2002 | Calvert et al. | |
| 6,597,995 B1 | 7/2003 | Cornu et al. | |
| 6,674,432 B2 | 1/2004 | Kennon et al. | |
| 6,754,588 B2 | 6/2004 | Cross et al. | |
| 6,941,255 B2 | 9/2005 | Kennon et al. | |
| 7,006,951 B2 | 2/2006 | Pond, Jr. et al. | |
| 7,027,964 B2 | 4/2006 | Kennon | |
| 7,043,367 B2 | 5/2006 | Granjeon | |
| 7,043,413 B2 | 5/2006 | Ward et al. | |
| 7,069,149 B2 | 6/2006 | Goff et al. | |
| 7,079,953 B2 | 7/2006 | Thorne et al. | |
| 7,089,166 B2 | 8/2006 | Malthe-Sorenssen et al. | |
| 7,117,091 B2 | 10/2006 | Masson et al. | |
| 7,123,258 B2 | 10/2006 | Deny et al. | |
| 7,149,671 B2 | 12/2006 | Lim et al. | |
| 7,162,463 B1 | 1/2007 | Wentland et al. | |
| 7,188,092 B2 | 3/2007 | Wentland et al. | |
| 7,260,508 B2 | 8/2007 | Lim et al. | |
| 7,277,796 B2 * | 10/2007 | Kuchuk et al. | 702/7 |
| 7,292,241 B2 | 11/2007 | Thore et al. | |
| 7,337,069 B2 | 2/2008 | Masson et al. | |
| 7,340,385 B2 | 3/2008 | James | |
| 7,363,158 B2 | 4/2008 | Stelting et al. | |
| 7,363,163 B2 | 4/2008 | Le Ra Valec-Dupin et al. | |
| 7,369,973 B2 | 5/2008 | Kennon et al. | |
| 7,379,854 B2 | 5/2008 | Calvert et al. | |
| 7,392,136 B2 | 6/2008 | Salles et al. | |
| 7,424,415 B2 | 9/2008 | Vassilev | |
| 7,433,786 B2 | 10/2008 | Adams | |
| 7,451,066 B2 | 11/2008 | Edwards et al. | |
| 7,480,205 B2 | 1/2009 | Wei | |
| 7,516,055 B2 | 4/2009 | Strebelle | |
| 7,523,024 B2 | 4/2009 | Endres et al. | |
| 7,542,037 B2 | 6/2009 | Fremming | |
| 7,548,873 B2 * | 6/2009 | Veeningen et al. | 705/7.12 |
| 7,606,691 B2 | 10/2009 | Calvert et al. | |
| 7,617,082 B2 | 11/2009 | Childs et al. | |
| 7,630,517 B2 | 12/2009 | Mirowski et al. | |
| 7,706,981 B2 | 4/2010 | Wilkinson et al. | |
| 7,711,532 B2 | 5/2010 | Dulac et al. | |
| 7,756,694 B2 | 7/2010 | Graf et al. | |
| 7,792,643 B2 * | 9/2010 | Herman et al. | 702/5 |
| 7,844,430 B2 | 11/2010 | Landis, Jr. et al. | |
| 7,925,481 B2 | 4/2011 | Van Wagoner et al. | |
| 7,933,750 B2 | 4/2011 | Morton et al. | |
| 7,953,585 B2 | 5/2011 | Gurpinar et al. | |
| 7,986,319 B2 | 7/2011 | Dommisse et al. | |
| 8,212,814 B2 | 7/2012 | Branets et al. | |
| 8,494,828 B2 | 7/2013 | Wu et al. | |
| 8,504,341 B2 * | 8/2013 | Cullick et al. | 703/10 |
| 8,515,678 B2 | 8/2013 | Pepper et al. | |
| 8,515,720 B2 | 8/2013 | Koutsabeloulis et al. | |
| 8,577,660 B2 | 11/2013 | Wendt et al. | |
| 2002/0120429 A1 | 8/2002 | Ortoleva | |
| 2004/0098200 A1 | 5/2004 | Wentland et al. | |
| 2006/0041409 A1 | 2/2006 | Strebelle et al. | |
| 2006/0122780 A1 | 6/2006 | Cohen et al. | |
| 2006/0184488 A1 | 8/2006 | Wentland | |
| 2007/0061117 A1 | 3/2007 | Landis, Jr. et al. | |
| 2007/0199721 A1 * | 8/2007 | Givens et al. | 166/382 |
| 2007/0276604 A1 | 11/2007 | Williams et al. | |
| 2008/0015784 A1 | 1/2008 | Dorn et al. | |
| 2008/0175478 A1 | 7/2008 | Wentland et al. | |
| 2009/0164182 A1 | 6/2009 | Pedersen et al. | |
| 2009/0312995 A1 | 12/2009 | Pyrcz et al. | |
| 2010/0312534 A1 * | 12/2010 | Xu et al. | 703/2 |
| 2011/0015910 A1 | 1/2011 | Ran et al. | |
| 2011/0054857 A1 | 3/2011 | Moguchaya | |
| 2011/0054869 A1 | 3/2011 | Li et al. | |
| 2011/0115787 A1 | 5/2011 | Kadlec | |
| 2011/0251830 A1 | 10/2011 | Hilliard et al. | |
| 2011/0310101 A1 | 12/2011 | Prange et al. | |
| 2012/0010865 A1 | 1/2012 | Benson | |
| 2012/0026167 A1 | 2/2012 | Ran et al. | |
| 2013/0030782 A1 | 1/2013 | Yogeswaren | |
| 2013/0046524 A1 | 2/2013 | Gathogo et al. | |
| 2013/0054201 A1 | 2/2013 | Posamentier et al. | |
| 2013/0246031 A1 | 9/2013 | Wu et al. | |

FOREIGN PATENT DOCUMENTS

| | | |
|---|---|---|
| EP | 1653411 | 10/2004 |
| EP | 1707993 | 3/2005 |
| EP | 1865343 | 6/2007 |
| EP | WO 2009/002715 | 12/2008 |
| EP | WO 2009/138290 | 11/2009 |
| WO | 2011/106135 | 9/2011 |
| WO | 2013/028234 | 2/2013 |

OTHER PUBLICATIONS

McCormick, et al., Integration of Analog Data for Building Testable, Deterministic Geological Models in a Common Interpretation Environment: An Example From the Atokan Boonville Gas Field, Ft. Worth Basin, Texas, SPE No. 57592, Oct. 1999, pp. 2-3.

Pyrcz, M.J., et al., 2005, Stochastic Surface-Based Modeling of Turbidite Lobes, AAAPG Bulletin, V. 89, No. 2, pp. 177-191.

Sech, R., 2007; Quantifying the Impact of Geological Heterogeneity on Gas Recovery and Water Cresting, with Application to the Columbus Basin Gas Fields, Offshore Trinidad, PhD Dissertation, Imperial College London.

Scaglioni, P. et al., 2006, Implicit Net-to-Gross in the Petrophysical Characterization of Thin-Layered Reservoirs, Petroleum Geoscience, V. 12, pp. 325-333.

Wen, w., et al., 1998, Three-Dimensional Simulation of Small-Scale Heterogeneity in Tidal Deposits—a Process-Based Stochastic Simulation Method. In: Buccianti, A. et al., (eds.), Proceedings of the 4th Annual Conference of the International Association of Mathematical Geology (IAMG), Naples, pp. 129-134.

* cited by examiner

FORMING A MODEL OF A SUBSURFACE REGION

CROSS-REFERENCE TO RELATED APPLICATION

This application is the National Stage of International Application No. PCT/US2009/059234, that published as WO2010/056427, filed 1 Oct. 2009 which claims the benefit of U.S. Provisional Application Nos. 61/114,798, filed 14 Nov. 2008, and 61/140,161, filed 23 Dec. 2008. The entirety of each of these applications is incorporated herein by reference for all purposes.

TECHNICAL FIELD

This application relates in general to geologic modeling, and in specific to computer-based systems and methods that allow formation of a geologic model of a subsurface region of interest, e.g., a sedimentary basin or a petroleum reservoir.

BACKGROUND OF THE INVENTION

A geologic model is a computer-based representation of a region of the earth subsurface. Such models are typically used to model a petroleum reservoir or a depositional basin. A geologic model commonly comprises a three dimensional (3-D) geocellular grid that is composed of contiguous 3-D cells. Each of the cells is assigned various properties, such as lithology, porosity, permeability, and/or water saturation, using various algorithms, e.g., geostatistical algorithms. After formation, the geologic model can be used for many purposes. One common use for the geologic model is as an input to a computer program that simulates the movement of fluids within the modeled subsurface region. These types of programs are used to predict, for example, hydrocarbon production rates and volumes from a petroleum reservoir over time.

Despite the usefulness of this technology, the current applications of the technology have several problems. For instance, one problem is that the geologic models do not precisely represent the geologic description of the region of interest. That is, current technology is not able to construct geologic models that precisely represent the characteristics of the interpreted or conceived geologic description which have a significant effect on the movement of fluids in the reservoir. Characteristics can include, for example, the compositions, dimensions, geometries, orientations, locations, and spatial, topological and hierarchical associations of various descriptive elements. The geologic description may also include information on spatial trends and/or changes in these elements, e.g., trends in composition, dimension and orientation. The descriptive elements represent regions of any scale within the reservoir, and the boundaries that separate contiguous regions. Regions can include but are not limited to stratigraphic regions, such as sequences or parasequences, facies regions, such as shale layers or individual channel facies, diagenetic regions, such as cemented or porous regions and fractured regions, and structural regions, such as fault blocks separated by fault planes. Geologic models built using current technology are not able to precisely represent the geologic characteristics that effect fluid flow within the model, because the technology was initially developed from subsurface mining, which was less concerned about fluid movement. As such, reliance on these model-based predictions are problematic when they are used as a basis for making business decisions, such as decisions relating to drilling and completing wells, and to constructing surface facilities to handle the production of hydrocarbons.

The geologic description used may be based on different techniques. For instance, an interpreted description is one that is derived by analyzing data obtained from the subsurface region being modeled. Alternatively, a conceived description is not or cannot be directly analyzed from these subsurface data, but is assumed to be accurate based on analog data and individual experience.

Inaccurate geologic description arises from one or more different factors. One factor is that the various descriptive geologic elements differ significantly in scale, but only a narrow range of scales can be precisely represented in the geologic model. In part, this is because all cells that constitute most geocellular grids have similar dimensions; i.e., represent approximately a single scale. As a result, the model can not explicitly represent descriptive geologic elements having scales finer than the grid cell dimensions commonly used in known simulation programs.

Another factor is that stochastic geologic modeling algorithms commonly used to form the geologic model are limited in their ability to precisely represent the descriptive elements, particularly if these elements are in minor abundance. Geostatistical simulation algorithms cannot reproduce geologic elements having long-range spatial correlation, such as facies having geometries represented by large sheets or long channels. Object-based algorithms (also referred to as Marked-Point or Boolean algorithms) can produce sheet and channel facies elements, yet one can not control placement of these facies in the model. For example, such control is desirable to control connectivity between well locations. As such, the modeling algorithms further limit the geologic description.

Yet another factor is that the geologic model, which is directly used for simulating fluid movement in the reservoir (e.g., the simulation model), may have limited resemblance to the input geologic description. Because of specific grid requirements for flow simulation, the simulation model is often constructed on a different grid from that of the initial geologic model. That is, to efficiently perform the simulation of fluid flow, the initial geologic model has its grid cells and their properties coarsened, which results in scale-averaging of the properties within the model. This re-gridding and scale-averaging can result in further distortions of the input geologic descriptions.

A second problem associated with current geologic modeling technology is an inability to rapidly construct and update the geologic model. Many modeling workflows require that multiple geologic models be constructed or updated, such as workflows associated with analyzing for the effects of uncertainty on flow predictions, or with optimizing the model to match field production data, e.g., history matching. For instance, as the geologic models may be large, the current models are difficult and inefficient to update to include new data from a new well. Inefficiency itself can lead to increased cost, though greatest risk comes when time constraints either prohibit these workflows or limit their effectiveness. Additionally, the geologic models often contain an abundance of geologic detail that is unnecessary to accurately simulate fluid-flow behavior in the model.

Considerable effort and time is required to construct and update such a geologic model, and this extra management of the geologic model further limits the construction and updates of these models.

Other related material may be found in U.S. Pat. Nos. 5,905,657; 6,035,255; 6,044,328; and 6,191,787.

Dubrule, O., et al., 1997, Reservoir Geology Using 3-D Modeling Tools, SPE 38659.

Landis, Lester H. and Peter N. Glenton, 2007, Reservoir Model Building Methods, published U.S. patent application 2007/0061117.

Murphy, William F. et al., 2000c, Apparatus for Creating, Testing, and Modifying Geological Subsurface Models, U.S. Pat. No. 6,070,125.

Pyrcz, M. J., et al., 2005, Stochastic Surface-Based Modeling of Turbidite Lobes, AAAPG Bulletin, V. 89, No. 2, pp. 177-191.

Scaglioni, P. et al., 2006, Implicit Net-to-Gross in the Petrophysical Characterization of Thin-Layered Reservoirs, Petroleum Geoscience, V. 12, pp. 325-333.

Wen, w., et al., 1998, Three-Dimensional Simulation of Small-Scale Heterogeneity in Tidal Deposits—a Process-Based Stochastic Simulation Method. In: Buccianti, A. et al., (eds.), Proceedings of the 4$^{th}$ Annual Conference of the International Association of Mathematical Geology (IAMG), Naples, pp. 129-134.

Wentland, Robert and Peter Whitehead, 2007a, Pattern Recognition Template Construction Applied to Oil Exploration and Production, U.S. Pat. No. 7,162,463.

Wentland, Robert and Peter Whitehead, 2007b, Pattern Recognition Template Application Applied to Oil Exploration and Production, U.S. Pat. No. 7,188,092.

SUMMARY OF THE INVENTION

The invention is directed to systems and methods that allow for rapidly constructing and updating geologic models representing a subsurface region of interest. The models use pre-built, editable, and re-usable templates that include elements and properties that may affect the movement of fluids in the subsurface region.

One embodiment in accordance with the present techniques is a method of forming a geologic model of a subsurface region. Data related to the subsurface region is obtained. A framework is constructed to represent the subsurface region. A template is selected from a plurality of templates. The selected template provides at least one property that is characteristic of the subsurface region. The selected template is inserted into the framework, to form the geologic model. The geologic model is then outputted.

Another embodiment in accordance with the present techniques is a method for forming a geologic model of a subsurface region. A template is defined to have at least one property that is characteristic of the subsurface region. The template is stored in a library. The library has a plurality of templates stored therein. The templates are organized according to at least one of depositional setting, geologic formation, diagenetic setting, time of deposition, geographic location, paleoclimate, water depth, structural setting, porosity, and burial depth. Data related to the subsurface region is obtained. A framework is constructed to represent the subsurface region. The framework is constructed using at least one explicit interface. The at least one explicit interface has at least one interface property associated therewith. Well data is inserted into the framework. The well data is positioned to correspond to a position in the subsurface region where the well data was obtained. A location of the well data is corresponded with the at least one explicit interface. A template region is defined within the framework. A template is inserted into the framework. The template is selected from one of the plurality of templates. A template hierarchical level is selected for the selected template. At least one conceptual interface is created within the template region based upon the selected hierarchical level and geologic characteristics associated with the template. At least one conceptual interface has at least one interface property associated therewith. At least one texture region is defined within the template region using at least one of the at least one explicit interface and the at least one conceptual interface. At least one texture property is modeled within the at least one texture region. The geologic model is outputted.

Another embodiment in accordance with the present techniques is a method for extracting a hydrocarbon from a subsurface region. Data is obtained that is related to the subsurface region. A framework is constructed to represent the subsurface region. A template is selected from a plurality of templates. The selected template provides at least one property that is characteristic of the subsurface region. The selected template is inserted into the framework, to form the geologic model. The geologic model is outputted. An extraction of a hydrocarbon from the subsurface region is achieved using the outputted geologic model.

The foregoing has outlined rather broadly the features and technical advantages of the present techniques in order that the detailed description of the invention that follows may be better understood. Additional features and advantages of the present techniques will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the present techniques, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present techniques, reference is now made to the following description taken in conjunction with the accompanying drawings, in which.

DETAILED DESCRIPTION OF THE INVENTION

Figure 1A:
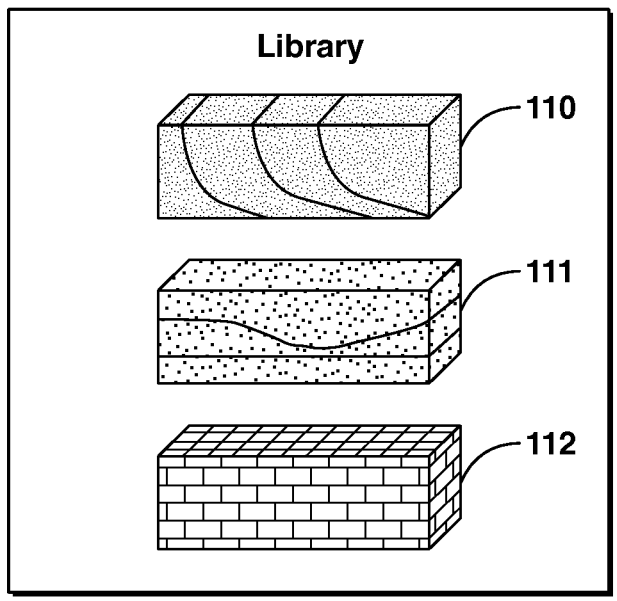
FIGS. 1A-1B depict an exemplary library of model templates, and an exemplary geologic model that is formed using the library, according to an embodiment of the present techniques.

At the outset, and for ease of reference, certain terms and their meanings, as used in this detailed description, are set forth below. Other terms may be defined in other portions of this patent application.

As used herein, "interface" is an edge of a geologic model and/or a boundary of a volumetric region of the geologic model. Interfaces may separate regions having contrasting flow properties, and/or behave as a barrier or conduit to flow. Interfaces can separate regions that include but are not limited to stratigraphic regions, such as sequences or parasequences, facies regions, such as shale layers or individual channels, petrophysical and/or diagenetic regions, such as cemented, porous or fractured regions, and structural regions, such as fault blocks.

As used herein, an "explicit interface" is an interface that is observed in or indicated from data related to the subsurface region being modeled. An explicit interface may be directly interpreted by analyzing these data.

As used herein, a "conceptual interface" is an interface that is not or can not be directly interpreted by analyzing data related to the subsurface region being modeled; rather, a conceptual interface is inferred to be present in the subsurface region based on other information, including analog data and the experience of individuals knowledgeable of the geologic setting.

As used herein, an "interface property" is a property that is assigned to an interface, generally related to controlling flow across an interface (as a barrier) or within an interface (as a conduit).

As used herein, a "texture region" is a volumetric region within the geologic model, bounded and defined by one or more interfaces.

As used herein, a "texture property" is a property of the reservoir that is assigned to a texture region and that is characteristic of that texture region, including for example, but not by way of limitation, rock type, composition, density, fluid content, porosity, permeability, fluid saturation, or a property that characterizes fluid-flow behavior within that texture region.

As used herein, a "template region" is a volumetric region within the geologic model, bounded by explicit interfaces and having a geologic character that can be represented by a template.

As used herein, a "template" is a quantitative and/or hierarchical characterization of at least one template region for a specific geologic setting. A template may include interfaces and associated texture regions associated with a specific geologic setting.

As used herein, a "template hierarchy" is a hierarchical classification of interfaces and associated texture regions within a template.

One or more embodiments of the present techniques form a geologic model for a region of interest. The region of interest may comprise a subsurface region, such as a petroleum reservoir or a depositional basin, or any other subsurface area. The geologic model of the region of interest can be used for many purposes, for example, the petroleum industry may use such a geologic model as an input to a reservoir simulation program for predicting hydrocarbon production.

Figure 1B:
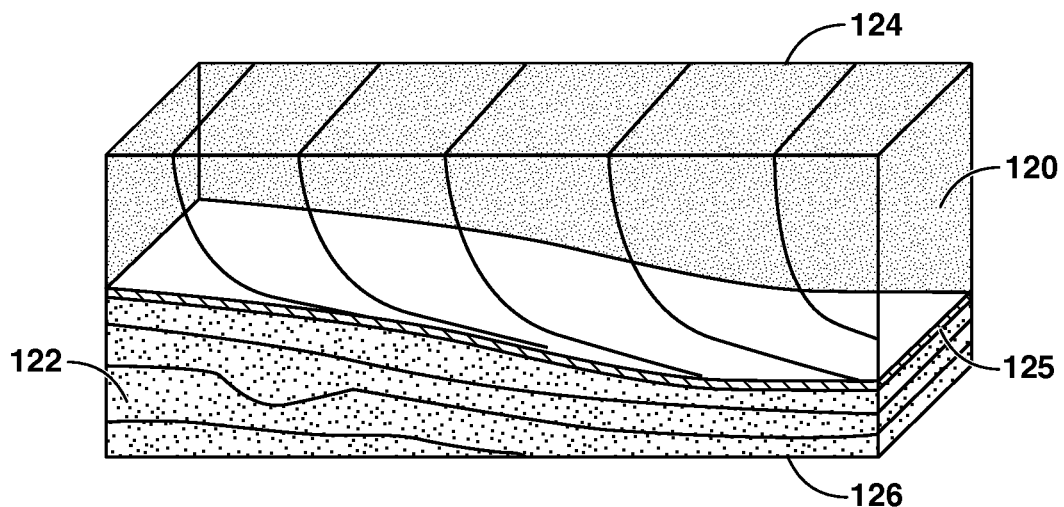

One or more embodiments of the present techniques may use one or more inputs, such as templates, to form the geologic or reservoir model. For instance, FIGS. 1A-1B depict an exemplary library 100 of model templates 110-112, and an exemplary geologic model 101 that is formed using the templates 110-112 of the library 100 according to an embodiment of the present techniques. The library 100, which may be one of the inputs, is a set of predefined templates 110-112 that may be selected and manipulated to form the model of the region of interest. The templates 110-112 may include representations of existing models, representations of conceptual geologic settings, based on knowledge about those settings, as should be known by experts through analog and experimental studies, and/or representations using a combinations of the above. As may be appreciated, the library 100 in this embodiment is a simple library for exemplary purposes only, as is the exemplary geologic model 101. Thus, in other embodiments, a library may comprise many more entries from a variety of inputs.

FIG. 1B is an example of a geologic model 101 that is formed using the templates 110-112 in the library 100. In this geologic model 101, a first region 120 is formed based on the template 110 and includes various properties and interfaces that are included with that template 110. The first region 120 is bounded by a first interface 124 and a second interface 125. A second region 122 is formed based on the template 111, which also includes the properties and interfaces of that template 111. The second region 122 is bounded by the second interface 125 and a third interface 126. As may be appreciated, the templates may be used to build a geologic model having certain properties and interfaces in a more efficient manner.

To further enhance the geologic description of geologic models, a template may include a quantitative characterization of texture regions and associated interfaces for any specific geologic setting or feature. This characterization may include a translation of an expert's knowledge about that geologic setting. Some characteristics may be fixed and others may vary and be described in terms of probabilities or statistical distributions. It should be appreciated that the library may also include other templates that represent a plurality of geologic or depositional settings; e.g. braided stream, carbonate platform and near shore marine deposits and settings that represent regions of diagenetic modification; e.g., cementation regions, dissolution regions and fracture regions. A template may be added to the library, or existing templates may be updated or modified as necessary, to represent new or different information about the geologic setting it represents.

Each of the various templates in the library represents a quantitative characterization of interfaces and their associated texture regions for different geologic settings. This characterization is a translation of the conceptual knowledge about that particular setting, as should be known by experts through analog and experimental studies. Analog studies are based on actual sedimentary deposits that represent the depositional setting. These can include ancient sedimentary deposits present in subsurface regions or regions that outcrop at or above the surface of the earth, and modern sedimentary deposits present at the surface of the earth. Experimental studies are based on models that represent the geologic setting. These models can be physical representations, such as those produced in an experimental flume tank, or can be computational representations, such as those produced with a computer. The computer algorithms attempt to mimic some or all of the physical, chemical, mechanical, and biological processes that both form and modify the sedimentary deposits over time.

Templates may comprise a hierarchy of interfaces. For example, one template may comprise a simple volume having only bounding interfaces and no internal interfaces. Other templates may comprise regions having more complex shapes and having free-form external interfaces. Other templates may have multiple internal interfaces that are classified in a structured hierarchy. The level of hierarchy assigned to any single or collection of interfaces is determined by relative scale. Regions bounded by coarser-scale, lower-order interfaces may contain interfaces of finer scale; i.e., at a higher-order level in the hierarchy. The relative degree to which these interfaces potentially influence a characteristic that is desirable to study in the model, for example the movement of fluids within the template region, may depend on the relative level of hierarchy.

Each template may include one or more texture regions. The texture property or properties associated with each texture region may be uniform or homogeneous throughout their spatial locations, or alternatively, the library may comprise a selection of different mathematical expressions that a user of the model process may use to trend a texture property associated with one or more of the texture regions to represent a non-uniform or inhomogeneous property. That is, the templates may also include a trended property, or a texture property that is non-uniform or inhomogeneous. The texture properties may be trended within a texture region, within a set of contiguous texture regions, within a template region, and/or between contiguous or adjacent template regions. Values associated with a texture property, therefore, can be uniform, vary according to a trend, or discretely vary from location to location within a texture region, or similarly vary across several contiguous texture regions. Variations in texture property values within or across texture regions can be controlled, for example, using continuous-property functions or discrete-property patterns. Patterns could be stochastically or deterministically modeled. Trends or variations in texture property values may also be imposed using interpreted data, for example from seismic data. Because the geologic model is not partitioned into cells, any trend should be defined and stored with the model in the form of continuous-property functions or discrete-property patterns that are specific to the region or regions being modeled.

The texture property may be any property that characterizes the desired interest being modeled, for example a property that characterizes fluid flow through the modeled texture region. Thus, the texture properties can be any property that might be used to characterize the fluid volumes or fluid-flow behavior within that texture region. Furthermore, the values of one texture property may be the same or different in different texture regions. Thus, a texture property such as porosity may be assigned different values in different texture regions. The assigned values may depend on the scale or hierarchy of the texture region, or upon other parameters according to observed or predicted characteristics of the geologic volume that is being modeled. Thus, the property value for a second order texture region may be the same or different from a first order texture region. Embodiments of a system or process using the library of template models may have a mechanism to vary one or more texture properties or interface properties by adjusting one or more values associated with said properties. Such varying of properties may be performed before, during, or after a template is selected to be included in a created geologic model.

A physical or visual representation of a template is referred to as a template realization. The template realization is essentially a geologic model that represents the specific template, and is useful for visualizing the conceptual geologic description. However, for applying templates in constructing models of actual subsurface regions, it is generally more practical and useful to represent and store the template characterizations in the form of parametric functions, parameters and rules. For example, interfaces within a template can be characterized using functions and parameters that define the location, shape, dimension, orientation and hierarchical level of each interface. Interface properties can be controlled using parameters, and trends in these properties along the interface can be characterized using functions. The spatial, topological and hierarchical associations of the collection of hierarchical interfaces within a template can be controlled using rules as will be further discussed herein.

To further understand the templates utilized in accordance with the present techniques, FIGS. 2A-2D are exemplary cross sectional views that describe a template that may be placed in a library according to an embodiment of the present techniques. In particular, these FIGS. 2A-2D depict different cross sectional views 200A-200D of an exemplary model template, which may be an entry within a library and which each represent one depositional setting that is known to occur in subsurface regions, specifically, a laterally offset amalgamated channel complex. Although views 220A to 200D could alternatively represent individual templates, in the currently discussed embodiment views 200A to 200D are shown as cross-sectional views of a complete three dimensional (3-D) template. Accordingly, each of the views 200A-200D of the template is discussed further below.

Figure 2A:
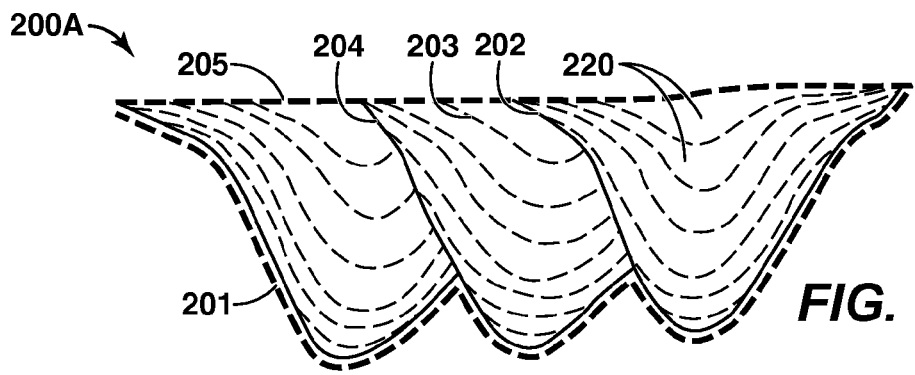
FIGS. 2A-2D are exemplary cross sectional views of a template of a library according to an embodiment of the present techniques.

The cross sectional view 200-A of FIG. 2A depicts a template that has multiple interfaces, which are an upper surface interface 205 and a lower interface 201, and multiple internal interfaces 202, 203, and 204. The different interfaces are imposed in a hierarchical order in the template. In this cross sectional view 200A, the first order interfaces are the upper surface interface 205 and the lower interface 201, which represent channel-complex boundaries. Upper surface interface 205 is the upper boundary of the geologic region to be modeled, and may be the surface of the earth, or may be located beneath the surface of the earth. In any event, the interfaces depicted in FIG. 2A possess characteristics that represent potentially significant flow barriers or conduits, and/or represent boundaries between texture regions, such as texture regions 220, having highly contrasting flow-controlling properties. Such interfaces could represent significant and extensive stratigraphic boundaries. Higher-order interfaces, such as the second-order interfaces 202 and 204 representing channel boundaries, and the third-order interfaces 203 representing channel storey boundaries, may represent less significant or extensive stratigraphic boundaries, but may still influence the movement of fluids in the geologic model.

The interfaces that are included in a template are not classified as either explicit or conceptual. This is because an interface is preferably not classified as explicit until it is interpreted in the subsurface data and used in model construction as will be described herein. Thus, all interfaces can either be explicit or conceptual until used in a model formation process. Further, a template may be set to a default designation, such as conceptual, until changed by or during the model process.

Figure 2B:
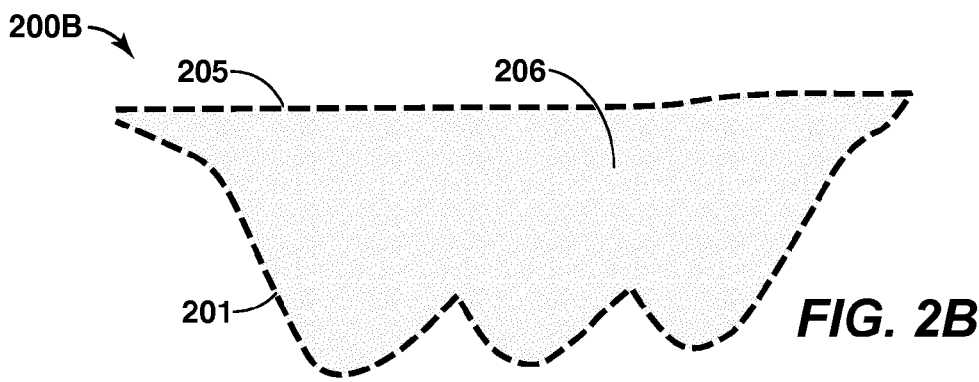
Figure 2C:
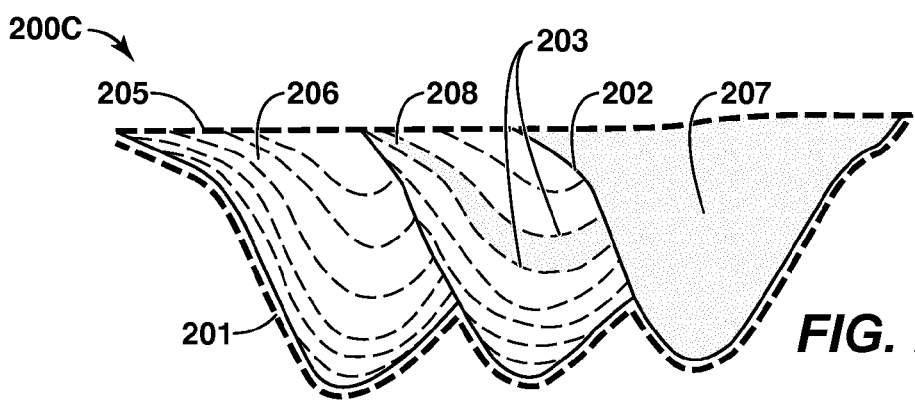

The cross sectional view 200A comprises only interfaces that bound texture regions of various scales or orders, and does not have properties associated for each of the texture regions. The library may comprise a selection of different texture properties that a user of the process may associate with one or more of the texture regions. For example, the cross sectional view 200B of FIG. 2B depicts a single texture region 206 for the template shown therein. The texture region 206 is a first-order texture region that is bounded by first-order interfaces 201 and 205, and in the depicted template represents an entire channel-complex region. Thus, any texture properties associated with this texture region affect the entire channel-complex region. In contrast, the cross sectional view 200C of FIG. 2C depicts multiple texture regions that differ in scale, depending on the hierarchical scale of the bounding interfaces. Thus, the interfaces partition the template into individual texture regions. For example, a second-order texture region 207, which represents an individual channel region, is bounded by a second-order interface 202, which represents a second-order interface channel boundary. A third-order texture region 208, which represents an individual channel storey region, is bounded by third-order interfaces 203, which represent third-order interface channel storey boundaries. The property associated with the texture regions 207 and 208 of this template are uniform or homogeneous throughout the respective texture regions, as signified by a constant grayscaling in the displayed texture regions in FIG. 2C. For the purpose of simplifying FIGS. 2C and 2D, most texture regions represented in these figures are not shaded, for example 211, though it is understood that properties would be associated with all texture regions.

Figure 2D:
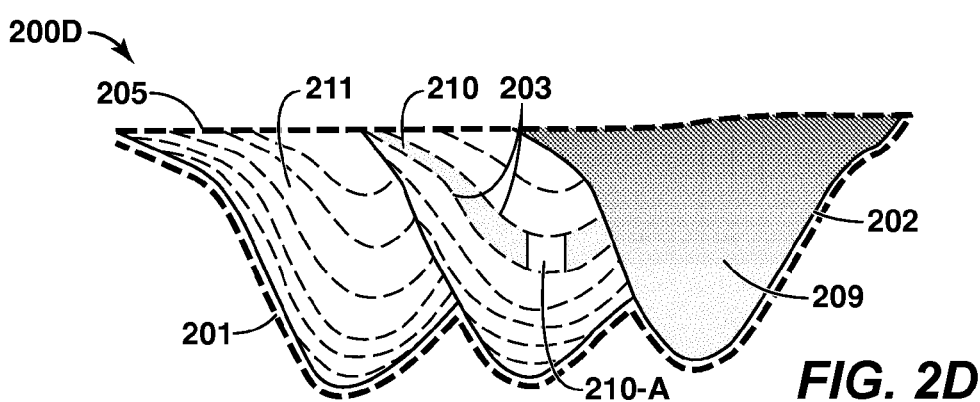

Alternatively, as noted above, the templates may include interfaces and/or texture regions having non-uniform or inhomogeneous properties. For instance, FIG. 2D depicts a cross sectional view 200D that includes texture regions of two different scales. Texture region 209, which is defined by interfaces 202 and 205, has a vertical trend in a texture property. This vertical trend can be expressed or displayed as a changing intensity in grey-scale as viewed in FIG. 2D. Texture region 210, which is defined by interfaces 202, 203, and 205 has a discontinuity 210-A in a displayed texture property value. This discontinuity can be expressed or displayed as a different pattern, such as an absence of gray scale as shown at reference number 210-A.

The template represented by cross sectional view 200A of FIG. 2A may be an exemplary template realization of a laterally offset, amalgamated channel complex. The hierarchical, spatial and topological relationships between the interfaces in this template can be defined using rules. For example, lower-order interfaces, e.g., the first-order interfaces 201 and 205, bound texture regions that contain higher-order interfaces, e.g., the second and third order interfaces 202, 203 and 204. The highest-order interfaces (e.g., interface 203) bound texture regions that contain no interfaces. The lower-order interfaces bounding a texture region may be referred to as parent interfaces, and higher order interfaces within the texture region may be referred to as its children interfaces. Modifying a parent interface in the model may also require modifying the children interfaces associated therewith.

A template realization may also have spatial relationships between interfaces in a template. Using the template represented by cross sectional view 200A of FIG. 2A as an example, the second-order interfaces 202 and 204, which represent the individual channel boundaries 202 and 204, are laterally offset and migrate from left to right. That is, a younger channel is to the right of an older channel. Therefore, interfaces that bound these channels also migrate from left to right. The third-order interfaces 203 are vertically stacked, not laterally associated, and therefore have their own unique spatial association.

A template realization may also have topological relationships between the interfaces. Again using the template represented by cross sectional view 200A of FIG. 2A as example, a younger second-order interface 202 cuts the next older second-order interface 204 such that the older interface touches but does not intersect the younger interface. Similarly, the younger, second-order interface 202 cuts the third-order interfaces 203 of the older second-order interface 204. Again, each third-order interface touches but does not intersect the younger second order interface.

In addition to rules that describe the hierarchical, spatial and topological relationships between interfaces in the template, the interfaces may need to deform to fit into the structured geologic model. The template realization may be represented by a relative coordinate system, referred to as a template coordinate system. These coordinates do not represent the actual location of any real region in the subsurface. When using a template in model construction, the elements of the template are mapped from the template coordinate system to a geologic model coordinate system that more closely represents the location of a real subsurface region. This can be done using any known approach, such as conformal mapping. Generally, one can perform the mapping using the rules that describe the relationships between interfaces. For example, if a child interface intersects a parent interface at a specified dip angle, then this angular relationship should be maintained even if the parent interface itself dips at a specified angle in the structured model. Also, if an interface is cut by a fault plane, the rules that describe how this interface is hierarchically, spatially and topologically associated with other interfaces should be maintained across the fault plane.

Figure 3A:
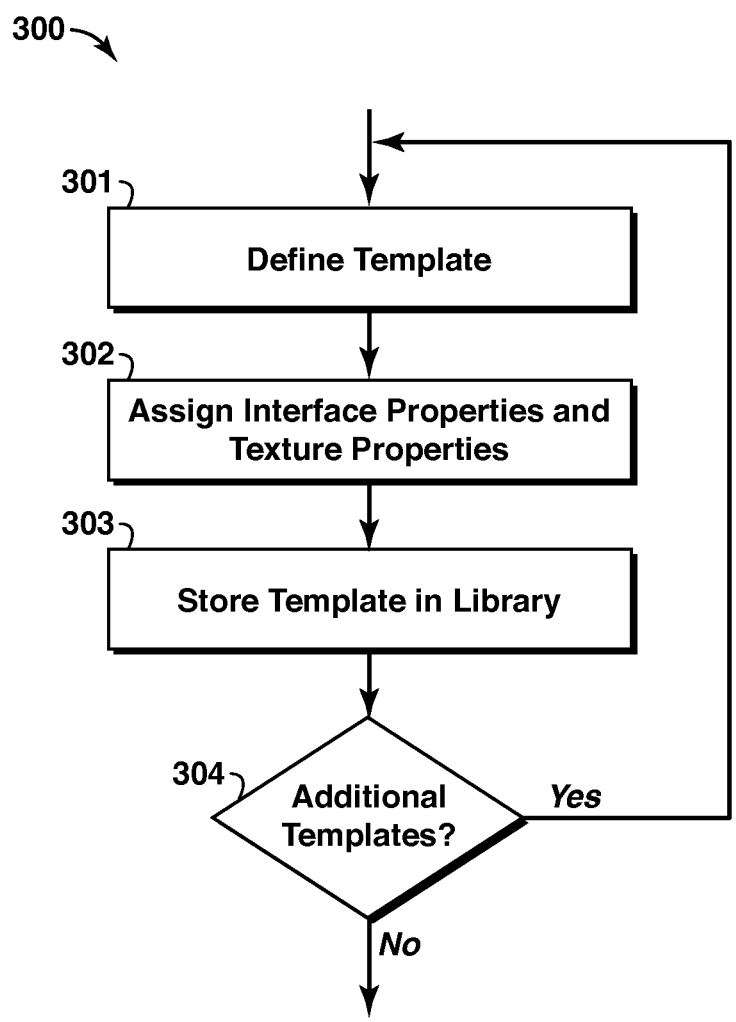
FIGS. 3A-3B depict an exemplary process flow to form a geologic model according to an embodiment of the present techniques.
Figure 3B:
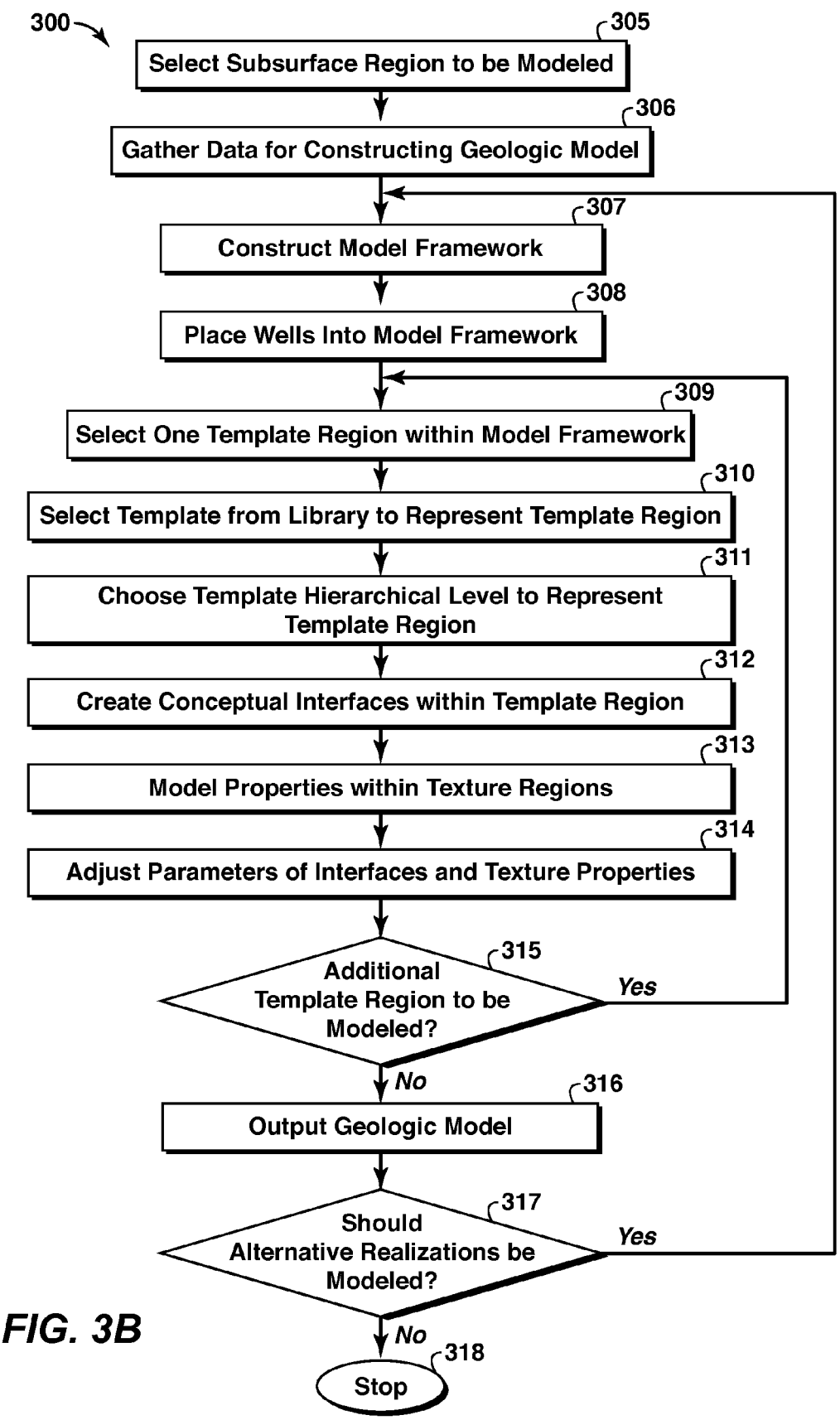
Figure 4A:
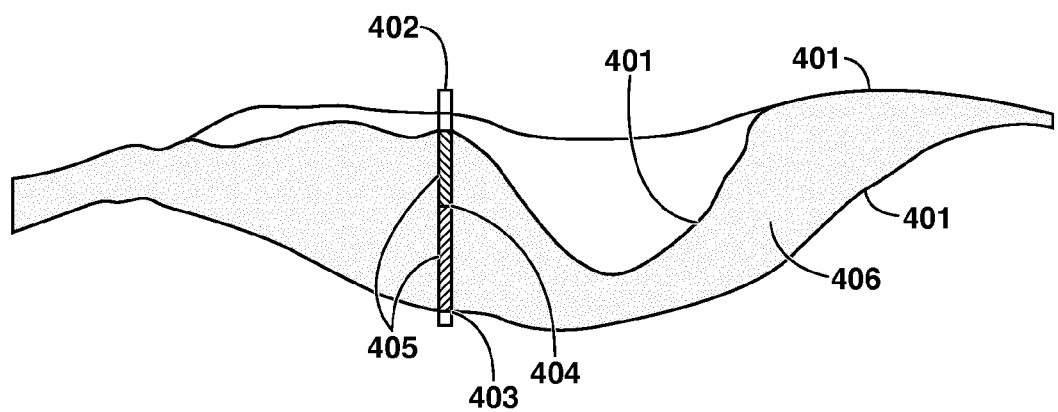
FIGS. 4A-4C are exemplary cross sections of a geologic model that is constructed using the process of FIG. 3.
Figure 4B:
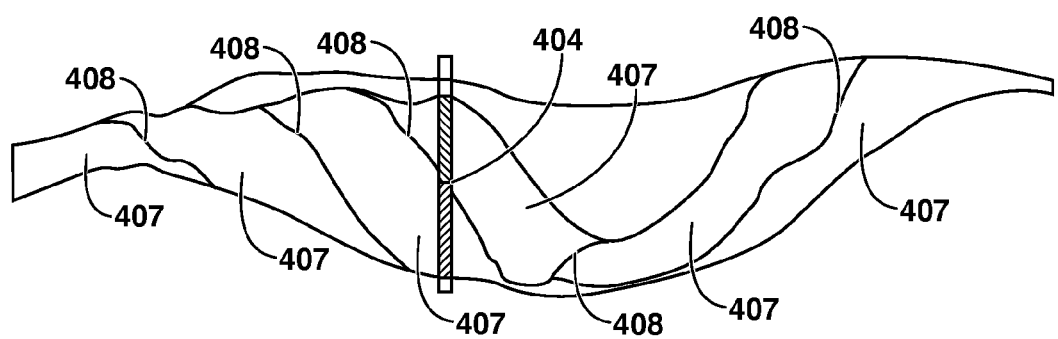
Figure 4C:
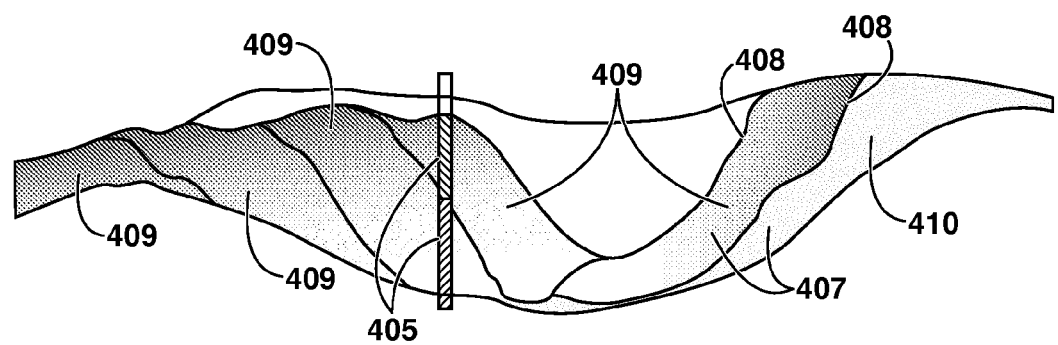

FIGS. 3A-3B depict an exemplary process flow 300 that forms a geologic model according to an embodiment of the present techniques. FIGS. 4A-4C are exemplary cross-sectional views of a geologic model of a laterally offset amalgamated channel complex setting constructed using the process of FIG. 3. Reference is also made to concepts and techniques previously described herein. Process flow 300 begins by defining a template to be used in forming the geologic model, as shown in block 301. The template may be defined as one or more interfaces defining one or more texture regions. The template may alternately be defined as comprising one or more interfaces without explicitly defining a texture region. The template may also be defined as comprising one or more texture regions without explicitly defining interfaces bounding the texture regions. After defining the template, properties are assigned to the interfaces and/or texture regions in the template, as shown in block 302. The varied sources, rules, nature of interface properties and texture properties have been previously discussed. Once all interface properties and texture properties have been assigned to the respective interfaces and texture regions in the template, the template is stored in a library, as shown in block 303. The library may include a plurality of templates that cover a broad spectrum of geologic settings. The library may be continuously updated as templates are added to represent new settings, or modified as geologic knowledge of existing settings evolve. Choosing one or a set of alternative templates from this library may be performed with the aid of a knowledge-based computing system (KBS). This type of system systematically organizes and stores templates in a library based on various template characteristics, which primarily relate to characteristics of the geologic setting. Such characteristics may include, but are not limited to, depositional setting (represented at various scales), geologic formation, diagenetic setting, time of deposition, geographic location, paleoclimate, water depth, structural setting, porosity, and burial depth. These same characteristics are used to data-mine the library for selecting appropriate templates, by providing specific information to the KBS on the specific geologic setting of the template region.

Process 300 then determines at block 304, through user input for example, whether additional templates are to be created. If so, the process 300 returns to block 301 for further template creation. If no further templates are to be created, the process continues. In block 305, which is shown in FIG. 3B, the process selects a subsurface region of interest to be modeled. The region of interest may comprise a subsurface region, such as a petroleum reservoir or a depositional basin, or any other subsurface volume. After selection of the subsurface region of interest, the data used to form a geologic model is obtained, as shown in block 306 (the order of blocks 305 and 306 may be reversed if obtained data suggest a subsurface region of interest). Such data may include the locations and sizes of explicit interfaces located by analyzing seismic and/or well data collected from the subsurface region of interest. Other data may include well top locations. Well tops are interfaces interpreted in the well data and are represented in FIGS. 4A-4C as points along the well path. Well tops bound intervals in the wells that represent texture regions. Well properties represent texture properties within each well interval. Other data that may be optionally used to form the model includes 3-D property trends, which is often interpreted from geophysical data. The trends are used to control the spatial distribution of properties within one or several texture regions or template regions within the model. Other data may comprise production data from existing wells within the geologic region that is being modeled. This data may be used for history-matching the model. Further data may comprise target statistics, which are used to control quantitative characteristics of the model, such as target pore volumes. Additional data may comprise conceptual data, which is data regarding properties that are inferred to be present in the subsurface region based on information such as analog data and the experience of individuals knowledgeable of the geologic setting. After the data and inputs have been gathered, the process 300 then constructs the initial framework for a geologic model, as shown in block 307. The model framework may be constructed from explicit interfaces 401, as shown in FIG. 4A. These explicit interfaces are defined by analyzing data obtained in block 306. In this example, interfaces 401 represent channel-complex scale interfaces. If one or more interfaces, or portions of interfaces, that are utilized to construct the framework do not actually exist in the subsurface region of interest because they have been removed by erosional processes, for example, pseudo-interfaces or conceptual interfaces may be defined in the geologic model, based on expert judgment as to their position and form.

One or more interface properties may be assigned to one or more interfaces at this point, or interface properties may be assigned later. Interface properties can be assigned to any explicit interface. One interface property type that may be assigned to an interface is permeability, which defines flow across the interface as a barrier or flow within the interface as a conduit. For this interface property, the interface is modeled to possess a defined finite thickness, and therefore an interface property associated with the interface defines the amount of thickness. As previously discussed, interface property values can be uniform, vary according to a trend, or discretely vary from location to location along the interface. Variations in interface property values along an interface can be controlled by, for example, using continuous-property functions or discrete-property patterns. Patterns could be stochastically or deterministically modeled along the interface.

After the model framework is constructed, wells may be placed into the model framework, as shown in block 308. For instance, a well 402 shown in FIG. 4A is positioned in the model to correspond with the location where it occurs in the subsurface region of interest. Well 402 is represented by its interpreted well tops 403 and 404 and interval properties 405. Explicit interfaces 401 intersect wells at their corresponding well tops 403. That is, the positions of the explicit interfaces in the geologic model are manually or automatically adjusted to correspond to the well top locations, and the locations of points or nodes along the interface should be adjusted or smoothed such that the interface shape at the well location is consistent with the interface shape away from the well location. A well top, such as well top 404, does not have to represent an explicit interface, because it may represent a conceptual interface. Though a well top representing a conceptual interface may be interpreted along the well path, it should be classified as conceptual because the entire interface is not or can not be directly constructed by analyzing and interpreting the subsurface data.

Then, at block 309, one template region is selected within the model framework. The selected template region, such as template region 406 of FIG. 4A, is a template region in the model that is bounded, at least in part, by any form of an explicit interface, such as boundary 401, with the exception of fault planes. Fault planes bound fault-block regions, hereafter referred to as fault blocks. Because a single template region can be intersected by a fault plane, the template regions can occur within a single fault block or can be partitioned into multiple fault blocks. Individual fault blocks may contain one or several template regions. Optionally, two or more template regions may overlay at the same location in the model. For example, two template regions may overlay at some locations within the model, and one template might represent the depositional setting and the other represent the diagenetic setting.

After selecting a template region, a template is selected from a library to represent the template region, as shown in block 310. The library may include one or more templates created during blocks 301-304 of process 300 such as the templates discussed above with respect to FIGS. 1A-1B and FIGS. 2A-2D. The selected template is selected to most closely represent the geologic character of the template region. The explicit interfaces that bound the template region are also represented in the chosen template.

After the template has been selected, an appropriate template hierarchical level is selected to represent the template region, as shown in block 311. Selecting this hierarchical level may also be performed with the aid of the KBS. The choice of appropriate hierarchical level depends on characteristics of the geologic setting, along with characteristics that are specific to the subsurface region of interest being modeled and simulated for fluid-flow behavior. One characteristic may be the fluid types and properties that are represented in the subsurface region, and therefore represented in the fluid-flow simulation on the model. Another characteristic may be the hydrocarbon recovery mechanism represented in the fluid-flow simulation on the model. Note that these mechanisms can include, but are not limited to, primary recovery and fluid injection. A further characteristic may be the location of wells that penetrate the subsurface region being modeled. For example, the selected hierarchical level may differ for template regions that include wells as opposed to those regions that do not. The selected hierarchical level may be different near wells as opposed to a distance from wells, even within the same template region. Other characteristics may be used. The hierarchical level that is selected is represented in the chosen template. If it is not, then a different template should be considered, or the chosen template should be updated or modified to include the desired hierarchical level.

After selection of the template hierarchical level, conceptual interfaces are created within the template region, as shown in block 312. The modeling of the conceptual interfaces involves using the template and the selected hierarchical level within the template. As shown in FIG. 4B, the conceptual interfaces such as interfaces 408 are added to the model, which may divide the template region 406 into multiple texture regions 407. Only those conceptual interfaces are represented by the chosen hierarchical level, and each of the lower-order conceptual interfaces (if any), are modeled within the template region. In the example of FIG. 4B, the second-order interfaces represented in the template are modeled within the template region 406. The modeling of these interfaces may be controlled by the parametric functions, parameters and rules that characterize the hierarchical template. The conceptual interfaces 408 should intersect wells at the corresponding location of well top 404. Interface properties such as permeability may be assigned to one or more of the modeled conceptual interfaces. The properties of conceptual interfaces may be created, assigned, and/or modeled similar to properties of explicit interfaces, as previously explained.

At block 313, one or more texture properties are modeled within each texture region of the template region. As shown in FIG. 4C, the model now includes texture properties 409 and 410, which are in various texture regions 407. If two or more texture regions overlay at some location in the model, the associated texture properties may combine in some fashion, e.g., they may be additive. Assigned texture property values can be uniform (e.g., texture properties 410), vary according to a trend (e.g., texture properties 409), or discretely vary from location to location within a texture region, or similarly vary across contiguous texture regions. Variations in texture property values within or across texture regions can be controlled, for example, using continuous-property functions or discrete-property patterns. Patterns could be stochastically or deterministically modeled. Trends and patterns can be interpreted in the subsurface data or based on a conceptual understanding of the geologic setting.

After filling the template region with texture properties, the parameters that define the texture properties and/or the interface properties of one or more template regions may need to be adjusted to ensure consistency with the input data, e.g., local well data, target statistics, and/or well production data. Accordingly, the parameters of interfaces and texture properties may be adjusted in block 314. Note that the adjustment to the parameters may be performed at any time in the process 300 after texture properties or interface characteristics have been integrated (e.g., added) to the model. Such modifications may include modifying the locations, geometries, orientations, and/or properties of one or more interfaces. The adjustments may also include modifying the texture properties and/or texture property trends of one or more texture regions. For example, in FIG. 4C, the assigned texture properties 409 may be adjusted to ensure consistency with the well interval properties 405. Preferably, a computer may be used to ensure that target statistics are met within an accepted tolerance, that texture properties are consistent with well interval properties, and that interfaces intersect wells at the corresponding well top locations. As any adjustment to interface properties and/or texture properties may create a template different from what was previously available in the library, a user may add to the library all or part of a created geologic model as a new template. Alternatively, a user may add to the library a template having characteristics that are consistent with those of the created geologic model.

The process 300 then determines if there is additional template region to be modeled to complete the geologic model, as shown in block 315. If another template region is to be modeled, the process returns to block 309 and repeats blocks 309-315 for the additional template region. The process 300 repeats until all template regions in the geologic model have been modeled. As additional template regions are modeled, interface properties and texture properties of the interfaces and texture regions in the geologic model may again have to be modified to account for property trends that span multiple template regions, or to account for global target statistics that represent multiple template regions. Once each of the template regions have been modeled, the geologic model comprising all modeled template regions is output at block 316. The outputting of the geologic model may include storing the model in memory or displaying the model on a monitor. The outputted geologic model may be used for any purpose, including the extraction of hydrocarbons such as oil, gas, or the like, from the subsurface region modeled herewith. This may be performed in part by including the outputted geologic model as an input to a computer program that simulates the movement of fluids within the modeled subsurface region of interest. Numerous programs are available and are being used to simulate the movement of fluids in geologic models, such as a program known as Eclipse and owned by Shlumberger, or a program known as VIP®, owned by Landmark. However, the unique characteristics of models built using embodiments as disclosed herein may involve modifications to the existing gridding and simulation algorithms that are applied by these programs.

In some instances, multiple model realizations may need to be constructed. For example, alternative model realizations may be constructed to analyze for the effects of geologic uncertainty on flow predictions, or alternative models may have to be constructed to achieve a history match to field production data. In such instances, block 317 of the process may return to block 307 to repeat blocks 307-317 for each alternative model. Some alternative realizations may require the process to return to block 307 to modify the model framework. For constructing other model realizations, the process may operate with the existing framework, but choose to select different templates to model within one or several template regions. In this instance, the process may return to block 310. The process may also involve keeping the templates that were selected for the initial model realization, but selecting a different template hierarchical level for modeling within one or several template regions. In this instance, the process returns to block 311. In another instance, a new model realization may involve adjusting the properties of the interfaces and/or texture regions within one or several template regions. In this instance, the process returns to block 314. The process ends at block 318 once the alternative model realizations have been modeled.

Updating an existing model may be similarly handled, in that only portions of the process may be repeated. If a new well has been added to the model, then adjustments may be made to change the location or interface property of one or more explicit or conceptual interfaces. A conceptual interface may further be designated as an explicit interface. Also, if new seismic data has been acquired, then one or more interface properties and/or texture properties may be adjusted to match or incorporate the new data. Thus, updating a model is not complex, nor is it time consuming or resource consuming.

Any of the functions described herein may be implemented in hardware, software, and/or firmware, and/or any combination thereof. When implemented in software, the elements of the present techniques are essentially the code segments to perform the necessary tasks. The program or code segments can be stored in a computer or processor readable medium. The "processor readable medium" may include any medium that can store or transfer information. Examples of the processor readable medium include an electronic circuit, a semiconductor memory device, a read-only memory (ROM), a flash memory, an erasable ROM (EROM), a floppy diskette, a compact disk CD-ROM, an optical disk, a hard disk, a fiber optic medium, etc. The code segments may be downloaded via computer networks such as the Internet, Intranet, etc.

Figure 5:
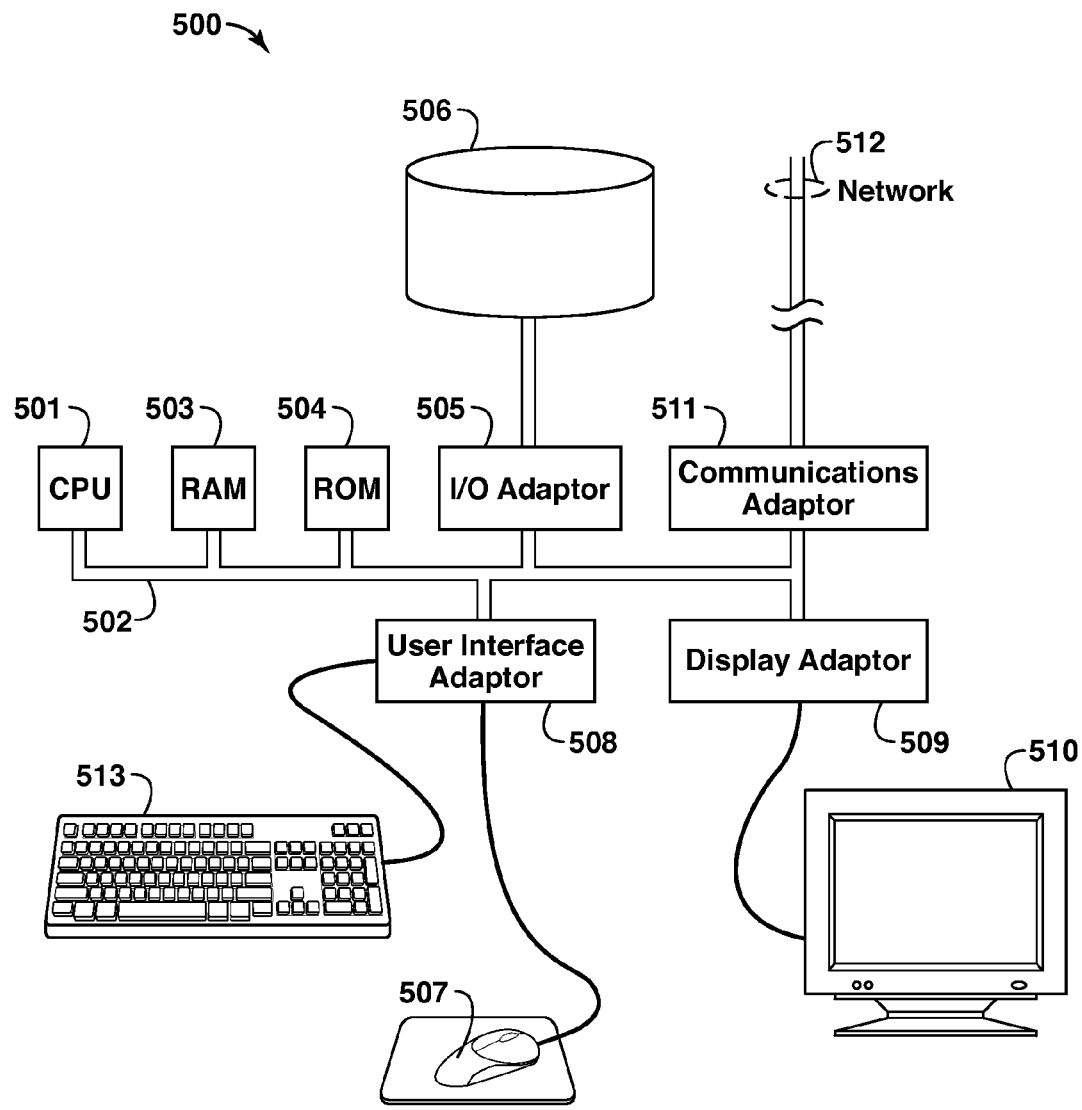
FIG. 5 depicts a block diagram of a computer system which is adapted to use an embodiment of the present techniques.

FIG. 5 illustrates a computer system 500 adapted to use the present techniques. Central processing unit (CPU) 501 is coupled to system bus 502. The CPU 501 may be any general purpose CPU, such as an Intel Pentium processor. However, the present techniques are not restricted by the architecture of CPU 501 as long as CPU 501 supports the certain operations as described herein. Bus 502 is coupled to random access memory (RAM) 503, which may be SRAM, DRAM, or SDRAM. ROM 504 is also coupled to bus 502, which may be PROM, EPROM, or EEPROM. RAM 503 and ROM 504 hold user and system data programs as is well known in the art.

Bus 502 is also coupled to input/output (I/O) adaptor 505, communications adaptor 511, user interface adaptor 508, and display adaptor 509. The I/O adaptor 505 connects to storage devices 506, such as one or more of a hard drive, a CD drive, a floppy disk drive, and a tape drive, to the computer system. The I/O adaptor 505 is also connected to printer (not shown), which allows the system to print paper copies of information such as documents, photographs, articles, etc. Note that the printer may be a printer (e.g., inkjet, laser, etc.,), a fax machine, or a copier machine. Communications adaptor 511 is adapted to couple the computer system 500 to a network 512, which may be one or more of a telephone network, a local (LAN) and/or a wide-area (WAN) network, an Ethernet network, and/or the Internet network. User interface adaptor 508 couples user input devices, such as keyboard 513, and pointing device 507, to the computer system 500. User interface adaptor 508 also provides sound output to a user via speaker(s) (not shown). The display adaptor 509 is driven by CPU 501 to control the display on display device 510.

The construction, visualization and analysis of geologic model realizations can be effectively performed using a high-end personal computer, computer workstation the system of FIG. 5, or any other suitable computer system. Any standard computer interface can be used, for example a standard mouse, keyboard and screen, though the use of a multi-touch, surface-computing interface is preferred. The surface-computing interface allows single or multiple users to manually adjust features on the surface screen itself, using touch-sensitive responses.

For example, a surface-computing interface such as a touch-screen display can be used to assign a template to a template region through tactile manipulation of a displayed image or area on the screen representing the desired template. Also, a surface-computing interface can be used to interactively manipulate the extent, value, position or stratigraphic dip of any part of the geologic model, for example by placing a hand or finger onto the screen to locate the desired part of the geologic model and moving the hand or finger with a specific gesture to achieve the desired result. The surface-computing interface can be used to assign or change a spatial trend in a texture property, for example by sliding a hand or finger across the screen in the direction of the trend. Furthermore, multi-touch, surface-computing technology may be applied to an even broader variety of tasks associated with the interpretation, analysis and modeling of a petroleum system, particularly those tasks that involve the manipulation or analysis of large quantities of data. Such tasks may benefit from the application of an improved human-machine interface that facilitates interactive data interrogation.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for forming a geologic model of a subsurface region comprising:
    obtaining data related to the subsurface region;
    constructing a framework to represent the subsurface region;
    selecting a template from a plurality of templates, wherein the selected template provides at least one property that is characteristic of the subsurface region, wherein the selected template is a quantitative and hierarchical characterization of at least one template region for a specific geologic setting and the template region is a volumetric region within the geologic model, bounded by explicit interfaces and having a geologic character represented by the selected template;
    inserting the selected template into the framework;
    selecting a template hierarchical level for the selected template;
    creating at least one conceptual interface within the template region based upon the selected hierarchical level and geologic characteristics associated with the template, wherein the at least one conceptual interface has at least one interface property associated therewith;
    defining at least one texture region within the template region using at least one of the explicit interfaces and the at least one conceptual interface;
    modeling at least one texture property within the at least one texture region to form the geologic model; and
    outputting the geologic model.

2. The method of claim 1, wherein the selected template further comprises at least one interface.

3. The method of claim 2, wherein the selected template further comprises at least one interface property that relates to fluid flow.

4. The method of claim 1, wherein the subsurface region is one of a sedimentary basin and petroleum reservoir.

5. The method of claim 1, wherein the data comprises at least one of seismic data, well data, property trends, and production data.

6. The method of claim 5, wherein the data further comprises at least one of conceptual data and statistical data.

7. The method of claim 1, wherein the plurality of templates comprise a library of templates, and each template in the library defines a geologic setting different from other templates in the library.

8. The method of claim 7, wherein the library is updated to include one of a new template that defines a new setting and new information for an existing setting.

9. The method of claim 7, wherein the library is organized by at least one geologic characteristic selected from the group comprising:
    a depositional setting, a geologic formation, a diagenetic setting, a time of deposition, a geographic location, a paleoclimate, a water depth, a structural setting, and a burial depth.

10. The method of claim 1, wherein the constructing the framework comprises:
    locating at least one explicit interface in the framework, whereby the one explicit interface at least partially bounds a template region; and positioning at least one well in the framework to correspond to a well located in the subsurface region, wherein the one well is defined by at least one interpreted top and at least one interval property.

11. The method of claim 10, further comprising:
assigning a property to the at least one explicit interface.

12. The method of claim 11, wherein the property is one of permeability and thickness.

13. The method of claim 11, wherein the property is a non-uniform property.

14. The method of claim 13, wherein the property is one of a continuous-property function and a discrete-property function.

15. The method of claim 1, further comprising:
segregating the framework into a plurality of template regions, wherein each of the plurality of template regions are bounded by one or more interfaces;
for each of the plurality of template regions, inserting a template selected from the plurality of templates such that a property associated with the selected template is characteristic of a portion of the subsurface region represented by the template region.

16. The method of claim 15, wherein at least one of the plurality of template regions overlays another of the plurality of template regions such that a property associated with the at least one of the plurality of template regions is combined with a property of the other of the plurality of template regions.

17. The method of claim 15, further comprising:
creating a conceptual interface within one of the plurality of template regions.

18. The method of claim 15, further comprising assigning at least one texture region to each of the plurality of template regions, wherein each of the at least one texture region has at least one texture property associated therewith.

19. The method of claim 18, wherein the at least one texture property is one of porosity, permeability and fluid saturation.

20. The method of claim 18, wherein the at least one texture property is constant throughout the at least one texture region.

21. The method of claim 18, wherein the at least one texture property is non-uniform in the at least one texture region.

22. The method of claim 21, wherein the at least one texture property is one of a continuous-property function and a discrete-property function.

23. The method of claim 18, wherein at least one of the plurality of texture regions overlays another of the plurality of texture regions such that the at least one texture property associated with the at least one of the plurality of texture regions is combined with at least one texture property of another of the plurality of texture regions.

24. The method of claim 15, further comprising selecting a level of hierarchy for the template based on at least one of a type of fluid in the subsurface region, a recovery mechanism for the fluid, and a well location in the subsurface region.

25. The method of claim 1, wherein the geologic model is used as an input to a computer program that simulates a movement of fluids within the subsurface region.

26. The method of claim 1, further comprising:
controlling a display device to provide a surface-computing interface to a user of the method, thereby allowing the user to control, through tactile manipulation of images displayed on the display device, the obtaining of data, the constructing of the framework, the selecting of a template, the inserting the selected template into the framework, and the outputting of the geologic model.

27. A method for forming a geologic model of a subsurface region, comprising:

defining a template to have at least one property that is characteristic of the subsurface region, wherein the template is a quantitative and hierarchical characterization of at least one template region for a specific geologic setting and the template region is a volumetric region within the geologic model, bounded by explicit interfaces and having a geologic character represented by the template;
storing the template in a library, the library having a plurality of templates stored therein;
organizing the templates according to at least one of depositional setting, geologic formation, diagenetic setting, time of deposition, geographic location, paleoclimate, water depth, structural setting, porosity, and burial depth;
obtaining data related to the subsurface region;
constructing a framework to represent the subsurface region, the framework being constructed using at least one explicit interface, wherein the at least one explicit interface has at least one interface property associated therewith;
inserting well data into the framework, the well data being positioned to correspond to a position in the subsurface region where the well data was obtained;
corresponding a location of the well data with the at least one explicit interface; defining a template region within the framework;
inserting, into the template region, a template selected from one of the plurality of templates;
selecting a template hierarchical level for the selected template;
creating at least one conceptual interface within the template region based upon the selected hierarchical level and geologic characteristics associated with the template, wherein the at least one conceptual interface has at least one interface property associated therewith;
defining at least one texture region within the template region using at least one of the at least one explicit interface and the at least one conceptual interface;
modeling at least one texture property within the at least one texture region to form the geologic model; and
outputting the geologic model.

28. A method of extracting a hydrocarbon from a subsurface region comprising:
obtaining data related to the subsurface region;
constructing a framework to represent the subsurface region;
selecting a template from a plurality of templates, wherein the selected template provides at least one property that is characteristic of the subsurface region, wherein the selected template is a quantitative and hierarchical characterization of at least one template region for a specific geologic setting and the template region is a volumetric region within a geologic model, bounded by explicit interfaces and having a geologic character represented by the selected template;
inserting the selected template into the framework;
selecting a template hierarchical level for the selected template;
creating at least one conceptual interface within the template region based upon the selected hierarchical level and geologic characteristics associated with the template, wherein the at least one conceptual interface has at least one interface property associated therewith;
defining at least one texture region within the template region using at least one of the explicit interfaces and the at least one conceptual interface;

modeling at least one texture property within the at least one texture region to form the geologic model;
outputting the geologic model; and
extracting the hydrocarbon from the subsurface region using the outputted geologic model.

* * * * *